J. BURKE.
SELECTIVE MOTOR.
APPLICATION FILED JAN. 6, 1914.

1,271,524.

Patented July 2, 1918.
2 SHEETS—SHEET 1.

Witnesses:

James Burke, Inventor
By his Attorneys
Edwards, Sager + Wooster

J. BURKE.
SELECTIVE MOTOR.
APPLICATION FILED JAN. 6, 1914.

1,271,524.

Patented July 2, 1918.
2 SHEETS—SHEET 2.

Witnesses:

James Burke, Inventor
By his Attorneys
Edwards, Sager & Wooster

UNITED STATES PATENT OFFICE.

JAMES BURKE, OF ERIE, PENNSYLVANIA, ASSIGNOR TO GENERAL RAILWAY SIGNAL COMPANY, A CORPORATION OF NEW YORK.

SELECTIVE MOTOR.

1,271,524.  Specification of Letters Patent.  Patented July 2, 1918.

Original application filed June 28, 1911, Serial No. 635,885. Divided and this application filed January 6, 1914. Serial No. 810,562.

*To all whom it may concern:*

Be it known that I, JAMES BURKE, a citizen of the United States, residing at Erie, in the county of Erie and State of Pennsylvania, have invented certain new and useful Improvements in Selective Motors, of which the following is a full, clear, and exact specification.

This application is a division of my original pending application, Serial Number 635,885, filed June 28, 1911.

This invention relates to the starting and operating of alternating current electric motors, such as induction motors from a single phase supply, in which the starting and operating of said motors are selective as regards the frequency of the single phase supply; that is to say, a motor under this system may be caused to operate in one direction of rotation when a certain predetermined frequency is applied and in the reverse direction when another predetermined frequency is applied, and will be entirely immune and have no operation at all when still another frequency is applied.

This selective quality has various applications and in my said original application, I have described its application to block signal railway systems wherein the railway is electrically operated and the electric power supply for operation of cars or locomotives is either single phase or polyphase as for example, of twenty-five cycles. In such a system the motor embodying my invention is utilized as the relay motor for the control of the signal and is caused to be immune to the propulsion current of a certain frequency, say twenty-five cycles, but is caused to operate in one direction for the control of the signal current of a different frequency, say sixty cycles. Also with a still different number of cycles, the motor may be caused to operate in the reverse direction.

Various other applications of my present invention may be made than to block signal systems, where selective operation by definite frequencies is desired, as will be understood by those skilled in the art.

My invention will be understood from the accompanying drawings, in which—

Figure 1:
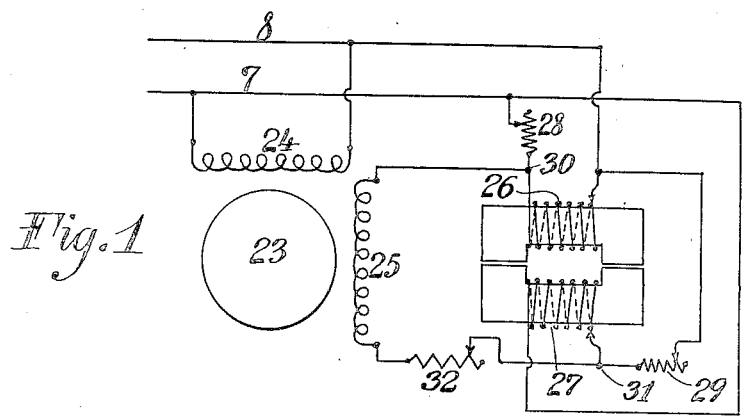
Figure 5:
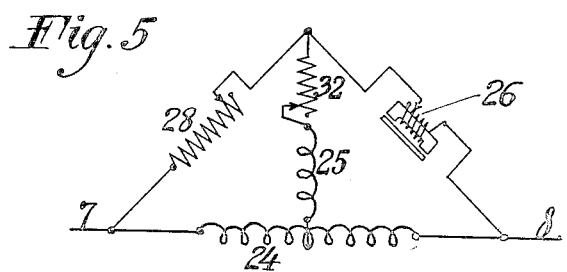
Figure 2:
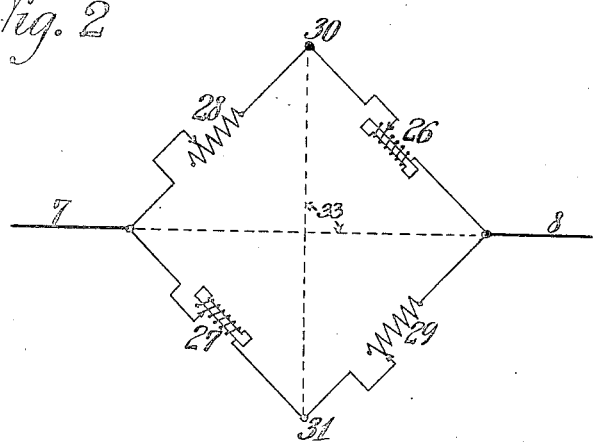
Figure 3:
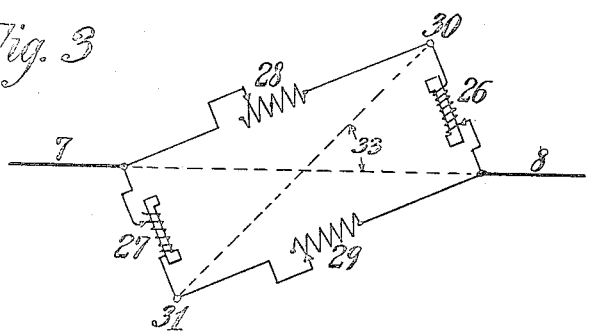
Figure 4:
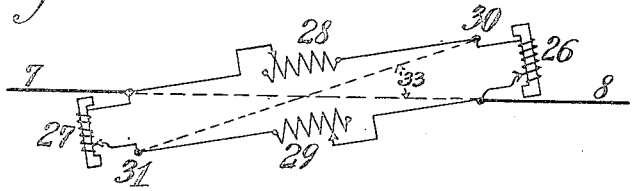

Figure 1 shows a diagrammatic arrangement of a motor together with auxiliary resistances and reactances which are preferably contained within the motor casing; Figs. 2, 3 and 4 illustrate the relative phase values resulting in the operation of the means embodying my invention with various frequencies, as will be better understood in connection with the description of each of these figures; Fig. 5 is a modification of the arrangement of circuits for the operation of the motor; and Fig. 6 is a detailed view illustrating independent magnetic circuits for reactances.

Fig. 1 shows one arrangement of a selective induction motor and associated circuits which are connected between the supply wires 7, 8. The rotor of the motor is indicated by 23 and the windings of the motor are indicated at 24 and 25, in this instance being two separate windings illustrated as being placed 90 degrees apart, as in an ordinary 2 phase induction motor, one of the phase windings being indicated at 24 and the other at 25, these two windings coöperating to operate the rotor of the induction motor, which rotor is indicated at 23. The two windings of the motor, 24 and 25, if supplied with alternating current with phase displacement between the current in the two windings, will produce a rotating field, thus causing the rotor 23 to operate. Winding 24 is supplied direct from the supply line 7 and 8; winding 25 is supplied through reactances 26 and 27 and resistances 28 and 29, each preferably adjustable in any suitable manner, resistance 28 and reactance 26 being connected in series between the supply lines 7 and 8, and reactance 27 and resistance 29 being connected in series between the same supply wires 7 and 8. Winding 25 is connected from the junction of resistance 28 and reactance 26, indicated at 30 to the junction of reactance 27 and resistance 29, indicated at 31. In series with winding 25 is resistance 32, as shown, preferably adjustable.

The function of the reactances 26 and 27 and the resistances 28, 29 and 32, is to regulate the phase displacement of winding 25 in reference to winding 24 of the motor.

Figure 6:
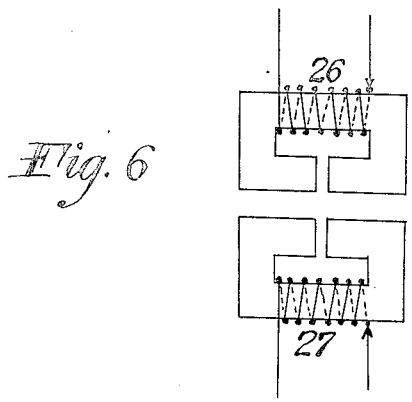

It will be seen that the reactances 26 and 27 have one magnetic circuit between them, as the fluxes are in series and in phase with each other, and the single magnetic circuit can therefore be used, but independent magnetic circuits could of course, also be used, as indicated in Fig. 6.

The action of regulating the phase will be best understood by the diagram Fig. 2.

Referring to Fig. 2, 7 and 8 represent the supply wires as used in Fig. 1, which supply the motor winding 24 direct, and for convenience is assumed to have a phase value of 0, as represented by the horizontal dotted line 7 and 8. The resistance 28 in series with the reactance 26, and the reactance 27 in series with resistance 29 are shown in the diagram and both are connected in multiple between the supply lines 7 and 8. Now assume that at 60 cycles the reactances 26 and 27 are each equal to the resistances 28 and 29. Then a potential will be established between the junction points 30 and 31 of phase value, as represented by the dotted line 30, 31, which it will be seen is displaced by a certain angle from the horizontal line 7 and 8, and which in Fig. 2, is approximately 90 degrees as indicated at 33 in the diagram. Under this condition, with phase winding 24 of the motor connected across 7 and 8, and with winding 25 across 30 and 31, eliminating modifying influences, the motor would have its phases supplied with approximately 90 degrees phase displacement, but the phase displacement may be modified by resistance 32 of Fig. 1, as will be explained later.

Now if the frequency of the supply between 7 and 8 is changed to say 25 cycle, the resistances 28, 29 and 32 remain unchanged, because they are independent of the frequency, but the reactances 26 and 27 are reduced approximately in proportion to the frequency, and the diagram therefore becomes for 25 cycle, as illustrated in Fig. 3. By referring to Fig. 3, it will be seen that the angle 33 is no longer 90 degrees as is the case in Fig. 2, but has become approximately 45 degrees, and the motor would, under this condition, have winding 25 lagging 45 degrees behind the phase of winding 24, unless modified by the resistance 32, shown in Fig. 1. The function of the resistance 32 is to modify the phase relations between phases 24 and 25 of the motor. It is known that the phases 24 and 25 have some inherent resistance and reactance, but if the two windings are alike, there would be no phase displacement between them if connected across the same supply mains, and consequently no rotation of the motor. If resistance is added to one phase, say 25, by putting resistance shown at 32 in Fig. 1 in series with it, then phase 24 would lag behind phase 25, and phase 25 would therefore lead in advance of 24.

Considering the 25 cycle condition when such a resistance for 32 is chosen as to make an angle of advance equal to the angle of lag produced by the reactances 26 and 27, and resistances 28 and 29 as shown in Fig. 3, and the winding 25 is connected with the resistance 32 in series with it across the points 30 and 31 of Fig. 3, as shown in Fig. 1, then the angle of advance cancels the angle of lag, and the two windings 24 and 25 have no phase difference between them and there is no rotation of the motor. Thus, if resistance 32 is chosen to make a lead of 45 degrees it will cancel the lag of Fig. 3, which is 45 degrees approximately, and no phase difference will exist, and consequently the motor will not operate, that is, it will be immune to 25 cycle supply.

If the supply is changed to 60 cycle the phase displacement becomes 90 degrees lag as shown in Fig. 2, less the lead due to the resistance 32 which is assumed as approximately 45 degrees, making a net lag in the phase of 25 of the motor, equal to 90 degrees minus 45 degrees, equals 45 degrees, and the motor will operate in the predetermined direction say, clockwise. In practice it will generally occur that the change in frequency will modify the phase lead due to resistance 32, so that the exact figure given above for the net lag of 45 degrees, will be modified in amount depending upon the characteristics of the motor, but the principle remains the same.

If we now apply say, 10 cycles, to the supply circuit, the diagram of phase relation changes on account of the change in reactance for this frequency, and becomes for example, as shown in Fig. 4, in which it will be seen that the angle indicated as 33 has become very much less and is approximately 19 degrees. Under this condition we have approximately 45 degrees lead, in phase 25 due to the resistance 32, and 19 degrees lag as shown in diagram Fig. 4, making a resultant of 45 minus 19, equals 26 degrees lead of phase 25 relatively to phase 24. Thus this means that the motor will now run in the opposite direction for at 60 cycle, 25 had a lag, but now at 10 cycles it has a lead, in reference to the winding 24.

Comparing the three diagrams Figs. 2, 3 and 4, and assuming a resistance 32, producing a lead in winding 25 of 45 degrees, we have the following tabulation:

| Cycles. | Diagram Fig. | Lag. | Lead due to resistance 32. | Lag-lead. |
|---|---|---|---|---|
| 60 | 2 | 90 | 45 | 45 |
| 25 | 3 | 45 | 45 | 0 |
| 10 | 4 | 19 | 45 | −26 |

The actual amount may be modified from the exact figures given, depending upon the characteristics of the motor, but as the table illustrates, at the assumed 25 cycle condition of Fig. 3, the motor is immune or has no phase difference, while at the 60 cycle condition of Fig. 2, it has a phase difference in one direction, or positive, and still at the condition of 10 cycles as in Fig. 4, it has a phase difference in the opposite direction, or negative, thus causing one direction of rotation at 60 cycle and another direction of rotation at 10 cycle.

It will be readily understood that the proportions of reactances, resistances, angles of lag, etc., should be chosen to best suit the requirements, but in all cases the invention utilizes the change in angle of lag, due to the variation in the value of the reactances with the frequency.

The reactance 26, 27 and resistance 28, 29 and 32, may all be contained in the motor case, only two wires coming out of the motor case.

Various modifications may be made, for example,—referring to Fig. 5, 7 and 8 are supply wires as before. 24 is one winding of the motor as before, but with its middle point connected to one end of winding 25 of the motor, and winding 25 preferably having half the turns of winding 24. 32 is the modifying resistance as before, in series with phase winding 25, and 26 a reactance, in series with 28 a resistance. This arrangement eliminates one of the resistances and one of the reactances, by interconnecting the windings of the motor, but the phase displacement and other actions are practically the same as in the previous illustrations.

In the description of windings of the motor 24 and 25, we assumed them displaced 90 degrees, but other displacements may be more suitable for certain cases.

Referring to Fig. 5, the halves of winding 24, one from 7 to the junction of 25, and one from the junction of 25 to 8, may be displaced in phase, or a 3 phase winding may be suitable in certain cases in which one phase is from 7 to the junction point of phase 25, and the other phase from the junction point to 8, or in other words, phase 24 of diagram 5, really represents in this case two phases of a three phase motor, and winding 25 represents the third phase of a 3 phase motor.

Various embodiments of my invention may be made as will occur to those skilled in the art, without departing from the scope of my invention.

Having thus described my invention, I declare that what I claim as new and desire to secure by Letters Patent is:—

1. A single phase supply circuit, an alternating current motor having on one of its members two displaced windings, means comprising resistance and reactance each connected in two circuits in parallel with each other across said supply mains, one of said windings being connected across the line and the other winding being connected in a circuit across intermediate points of said two circuits in parallel, and means in the circuit of one of said windings tending to make the lead or lag in one winding more dependent upon the frequency than in the other winding.

2. A single phase supply circuit, an alternating current motor having on one of its members two displaced windings, one of said windings being connected directly across said supply circuit, a Wheatstone bridge also connected across said supply circuit with inductances in two opposite sides thereof and resistances in the other two opposite sides, the other of the two windings of said motor being connected across said bridge, the time constants of the two windings being different whereby the current in one winding will have its phase relation determined in greater degree by the frequency than in the other winding.

3. A single phase supply circuit, an alternating current motor having on one of its members two displaced windings, one of said windings being connected directly across said supply circuit, a Wheatstone bridge also connected across said supply circuit with inductances in two opposite sides thereof and resistances in the other two opposite sides, the other of the two windings of said motor being connected across said bridge, and a resistance in series with said last mentioned winding, whereby the relative lag or lead of the currents in the two windings will be dependent on the frequency in the supply circuit.

In testimony whereof I affix my signature, in presence of two witnesses.

JAMES BURKE.

Witnesses:
　L. K. SAGER,
　GEO. N. KERR.